United States Patent
Anderson et al.

(10) Patent No.: US 10,257,047 B2
(45) Date of Patent: Apr. 9, 2019

(54) SERVICE AVAILABILITY RISK

(71) Applicant: International Business Machines Corporation, Armonk, NY (US)

(72) Inventors: Eric M. Anderson, Friendswood, TX (US); Robert A. Davis, Atlanta, GA (US); Terry L. Keebaugh, Alpharetta, GA (US); Eric K. Watson, Acworth, GA (US)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 15/215,709

(22) Filed: Jul. 21, 2016

(65) Prior Publication Data
US 2018/0026852 A1    Jan. 25, 2018

(51) Int. Cl.
*H04L 12/24* (2006.01)
*H04L 12/26* (2006.01)

(52) U.S. Cl.
CPC ........ *H04L 41/147* (2013.01); *H04L 43/0805* (2013.01); *H04L 43/16* (2013.01)

(58) Field of Classification Search
CPC .... H04L 41/147; H04L 43/0805; H04L 43/16
See application file for complete search history.

(56) References Cited

U.S. PATENT DOCUMENTS

| | | | |
|---|---|---|---|
| 7,877,284 B2 | 1/2011 | Hernandez et al. | |
| 2006/0161883 A1* | 7/2006 | Lubrecht | G06Q 10/06 717/104 |
| 2007/0015124 A1 | 1/2007 | Mobbs et al. | |
| 2009/0319326 A1 | 12/2009 | Yamada | |

OTHER PUBLICATIONS white paper Microsoft Operations Framework (MOF) (Oct. 2002) to Microsoft. ("Microsoft") (Year: 2002).*

* cited by examiner

*Primary Examiner* — June Y Sison
(74) *Attorney, Agent, or Firm* — Isaac J. Gooshaw (57) ABSTRACT

A processor receives service availability data for at least one service, where the service availability data indicates an amount time the at least one service was available and an amount of time one or more resources utilized in the service was available. A processor receives service configuration data for the service, where the service configuration data indicates one or more resource requirements of the at least one service. A processor determines one or more resource unavailability scores for the one or more resources utilized in providing the service. A processor determines one or more resource replacement scores for the one or more resources utilized in the service. A processor determines availability risk scores for the at least one service based on the one or more resource unavailability scores and the one or more resource replacement scores. A processor generates an indication of at-risk services of the at least one service.

20 Claims, 4 Drawing Sheets

| Resource | Unavailability |
|---|---|
| 1:2:3:4 | 0.35 |
| 1.1 | 0.05 |
| 10.0.0.0 | 0.25 |

FIG. 3C

| Configuration | Replacement |
|---|---|
| Server X | 0.25 |
| OS Y | 0.85 |
| Network Infrastructure Z | 0.55 |

FIG. 3D

| Resource | Risk |
|---|---|
| 1:2:3:4 | 0.35/0.25=1.4 |
| 1.1 | 0.05/0.85=0.1 |
| 10.0.0.0 | 0.25/0.55=0.5 |

SERVICE AVAILABILITY RISK

BACKGROUND OF THE INVENTION

The present invention relates generally to the field of service availability, and more particularly to the potential risk of a resource involved in providing the service becomes unavailable.

Service availability is an important metric of systems that provide a service to users. Typically, service availability is measured by uptime, or the amount of time users can access a service over a given period of time. For the time that a service is unavailable, the service accrues downtime during the given period of time. The ratio of uptime versus downtime indicates a service's availability. High service availability is sought after by service providers, since large portions of downtime greatly impact users' access to the service.

SUMMARY

Embodiments of the present invention provide a method, system, and program product to generate lists of at-risk services. A processor receives service availability data for at least one service, where the service availability data indicates an amount time the at least one service was available and an amount of time one or more resources utilized in providing the service was available. A processor receives service configuration data for the service, where the service configuration data indicates one or more resource requirements of the at least one service. A processor determines one or more resource unavailability scores for the one or more resources utilized in providing the service. A processor determines one or more resource replacement scores for the one or more resources utilized in providing the service. A processor determines one or more availability risk scores for the at least one service based, at least in part, on the one or more resource unavailability scores and the one or more resource replacement scores. A processor generates an indication of at-risk services of the at least one service based on the one or more availability risk scores for the at least one service exceeding a predetermined threshold.

DETAILED DESCRIPTION

While solutions to determining service availability are known, they typically provide only historical metrics. Embodiments of the present invention recognize that by analyzing information regarding resources involved in providing a service, a possible risk of a resource impacting service availability can be provided to a service provider. Furthermore, by analyzing potential replacements for the resource impacting service availability, embodiments of the present invention provide action plans for handling possible downtime risk due to a resource becoming unavailable during operation of a service. By identifying resources that may impact a service's availability and determining a risk associated with the resource becoming unavailable, embodiments of the present invention provide improvements to a computing platform providing said service by increasing uptime by presenting potential resource gaps that may later increase downtime of said service.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
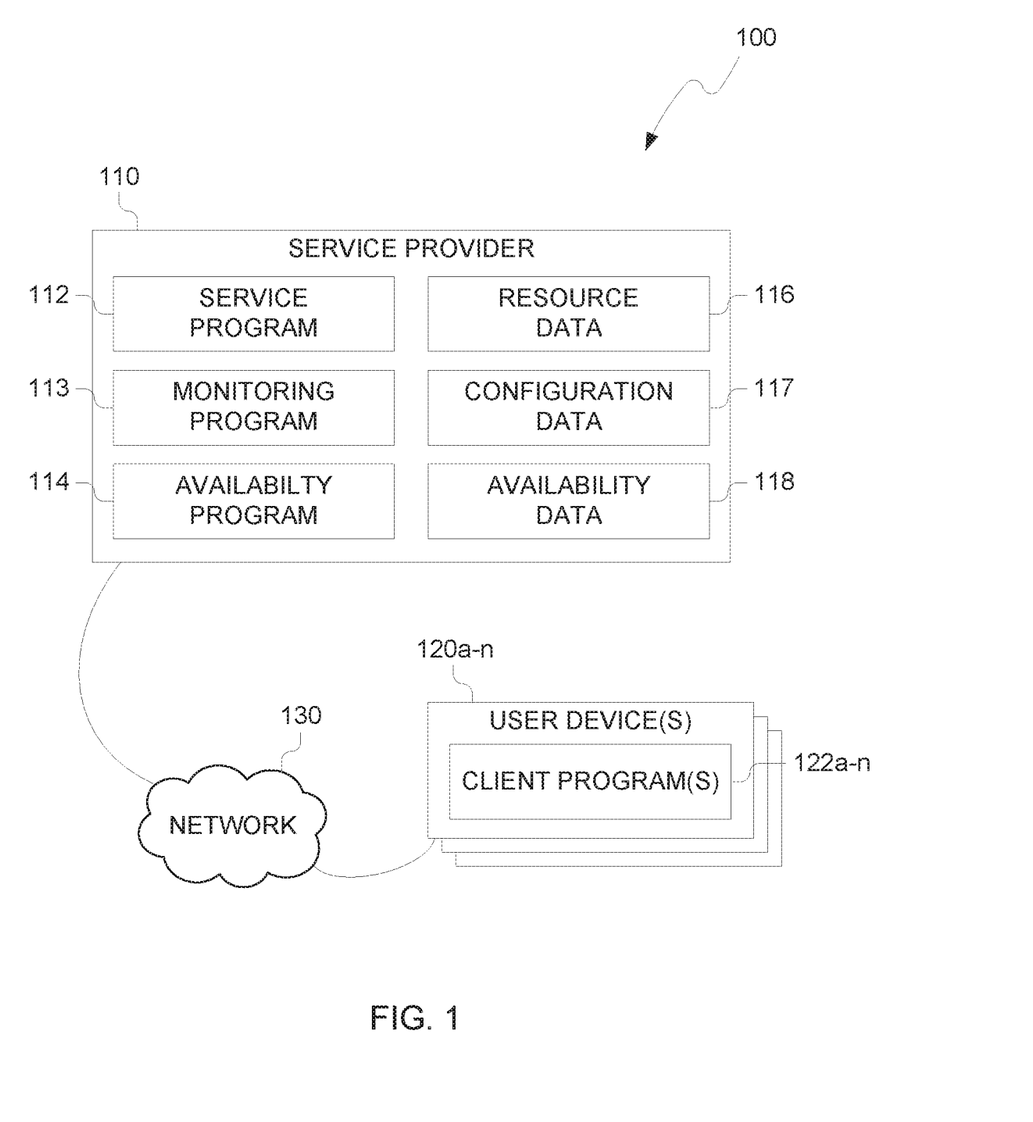
FIG. 1 is a functional block diagram illustrating a networked environment, in accordance with an embodiment of the present invention.

The present invention will now be described in detail with reference to the Figures. FIG. 1 is a functional block diagram illustrating networked environment, generally designated 100, in accordance with one embodiment of the present invention. Networked environment 100 includes service provider 110 and user device(s) 120*a-n* connected over network 130. Service provider 110 includes service program 112, monitoring program 113, availability program 114, resource data 116, configuration data 117, and availability data 118. User devices 120*a-n* include respective client program(s) 122*a-n*.

In various embodiments of the present invention, service provider 110 and user device(s) 120*a-n* are computing devices that can be a standalone device, a server, a laptop computer, a tablet computer, a netbook computer, a personal computer (PC), or a desktop computer. In another embodiment, service provider 110 or user device(s) 120*a-n* represent a computing system utilizing clustered computers and components to act as a single pool of seamless resources. In general, service provider 110 or user device(s) 120*a-n* can be any computing device or a combination of devices with access to resource data 116, configuration data 117, and availability data 118 and is capable of executing service program 112, monitoring program 113, availability program 114, and user program(s) 122*a-n*. Service provider 110 and user device(s) 120*a-n* may include internal and external hardware components, as depicted and described in further detail with respect to FIG. 4.

In this exemplary embodiment, service program 112, monitoring program 113, availability program 114, resource data 116, configuration data 117, and availability data 118 are stored on service provider 110. However, in other embodiments, service program 112, monitoring program 113, availability program 114, resource data 116, configuration data 117, and availability data 118 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between service provider 110 and user devices 120*a-n*, in accordance with a desired embodiment of the present invention.

In various embodiments, service provider 110 provides a service to user devices 120*a-n*. Service program 112 provides data to client programs 122*a-n* regarding the service provided. One of ordinary skill in the art will appreciate that any service may be provided by service provider 110 to user devices 120*a-n* without deviating from the scope of the invention. For example, service provider 110 provides distributed computing or virtualization services. As another example, service provider 110 provides software services such as an e-commerce store or a payroll application. Service provider 110 includes various resources to perform operations and functions associated with the provided service. Resources include, but are not limited to, hardware resources (e.g., systems, servers, and subsystems or components of said systems and servers), software resources (e.g., programs, operating systems and firmware installed on various hardware services), and networking resources (e.g., infrastructure and connections to provide distribution and communication with the hardware and software resources, in addition to communicating with user devices 120*a-n*).

In various embodiments, resource data 116 includes information indicating the various resource currently utilized in providing a service. Resource data 116 includes information including identifiers or other information indicative of the various hardware resources, software resources and networking resources used in providing a service or functions of a service. Additionally, resource data 116 includes the information indicative of the parts, components or software associated with a resource. For example, a server is utilized in providing a service and is identified in resource data 116 by a media access control (MAC) number or an internet protocol (IP) number resource data 116 also includes the processor type and amount of storage associated with this particular server. As another example, software resources in resource data 116 are identified by a name and associated with a version number. In various embodiments, resource data 116 also includes information regarding resources not currently used in a service. As discussed herein, such resources are candidate replacements for the utilized resources.

In various embodiments, configuration data 117 includes data indicative of the resource requirements of services. Configuration data 117 includes the types of resources required to perform a service. For example, the servers, databases, programs and network infrastructure necessary to provide a service. In some embodiments, service provider 110 provides multiple services or utilizes multiple services to provide a service. In such embodiments, one or more services may depend on functionality provided by another service. In these scenarios, configuration data 117 includes the dependency or service chain between services. For example, service provider 110 provides user devices 120*a-n* a payroll application service. In order to provide the necessary functionality, service provider 110 includes a timesheet application service to retrieve hours worked and other information necessary for payroll. As such, the payroll service depends upon the timesheet service. If the timesheet service became unavailable then the payroll service, that depends on the timesheet service, would also be unavailable. Configuration data 117 indicates this dependency among the services.

In various embodiments, monitoring program 113 monitors the activity and availability of the services provided by service provider 110. Additionally, monitoring program 113 monitors the availability of resources for each service. Monitoring program 113 keeps track of each service and resource, storing the amount of uptime and downtime for both in availability data 118. As resources become unavailable, monitoring program 113 stores indications of the resources that are down and the services the resources impact.

In various embodiments, availability program 114 provides indications to a user of service provider 110 of services or resources at risk of becoming unavailable. Availability program 114 retrieves availability data 114. Availability program 114 determines a score for each resource's predicted unavailability. Based on past downtime, availability program 114 determines the probability that a resource will become unavailable for a period of time in the future. In some embodiments, availability program 114 determines an unavailability score for each resource's predicted unavailability based on the lifetime or age of the resource. For example, availability program 114 assigns a higher unavailability score to an older resource compared to resource more recently deployed.

In various embodiments, availability program 114 determines a score for each resource's replacement. The replacement score identifies the ease of or ability to find a replacement for the resource. Availability program 114 receives data of potential replacements for a resource. In some embodiments, availability program 114 compares the potential replacements to configuration data 117. Potential replacements that meet or exceed the resource requirements are included in further analysis. In some embodiments, availability program 114 considers potential replacements that do not currently meet the resource requirements, but may be configured to meet the requirements. For example, a server does not currently have a required software resource installed. Given that the server meets the hardware resource requirements, availability program 114 includes the server as a potential candidate. In such embodiments, availability program 114 assigns a weight to each resource based on the match of the resource requirements for a replacement.

In various embodiments, availability program 114 determines a replacement score for a currently employed resource based on the amount of potential replacement candidates. The larger the number of replacement candidates, the higher the replacement score. Due to a larger selection of potential replacement candidates, replacing a resource due to potential downtime becomes a more feasible solution. However, if a replacement is less feasible (i.e., a lower replacement score), then potential downtime is more impactful. By comparing the ratio of a resource's unavailability score to the resource's replacement score, availability program 114 determines an availability risk score for a resource. Resources with less potential downtime, or lower unavailability scores, have less risk of becoming unavailable. Resources that are easily replaced, or have high replacement scores, also have less risk of becoming unavailable. As unavailability rises and replacement lessens, the risk for a resource to become unavailable for greater periods of time increases.

In various embodiments, availability program 114 determines affected services based on the availability risk score for resources of each service and the dependency of services an indicated in configuration data 117. For example, if a subsystem or component service becomes unavailable, parent services or services that rely upon the unavailable service also become unavailable. When a resource's availability risk score is above a certain threshold, the resource is at risk of becoming unavailable. Availability program 114 identifies each resource and system impacted by the resources unavailability and provides an indication that the dependent resources and services are also at risk of becoming unavailable. In some embodiments, a component resource or service has less impact on a dependent service. For example, a database or storage system may be redundant or mirrored on another resource. In such embodiments and scenarios, availability program 114 assigns a weight to each redundant resource and combines the availability risk score for each resource as a weighted sum (e.g., both redundant storage resource is assigned a uniform or one-half weight when combined).

In various embodiments, availability program 114 provides an action plan based on the availability risk score, the unavailability score and the replacement score. When a resource fails below a predetermined availability risk score, availability program 114 provides an indication of the resource, and services, that are at risk of being unavailable.

Furthermore, availability program 114 provides an action plan when the resource exceeds a predetermined availability risk score. If the replacement score is above a predetermined value, then availability program 114 suggests finding a replacement for the resource. If the replacement score is low, then availability program 114 suggests maintenance or a different configuration. In various embodiments, monitoring program 113 collects availability data 118 for each resource, updating availability data 118 with any new downtime or uptime of resources and services. Availability program 114 recalculates the availability risk score, the unavailability score and the replacement score for each resource and service based on the updated availability data 118, thereby providing up to date indications and action plan for the resources used in providing services of service provider 110.

In some embodiments, resource data 116 includes an indication or association of one or more operators or administrators to a resource. In such embodiments, the operators or administrators provide support for the operation and functionality of the resources utilized in providing a service. When determining a resources unavailability score, availability program 114 includes the probability one or more operators of the resource will leave or no longer be able to provide support for the resource. For example, as an operator approaches retirement age, availability program 114 increases the probability a resource will become unavailable, as the operator will no longer be able to support the resource.

In some embodiments, availability program 114 includes potential replacement operators or administrators when determining a replacement score for a resource. If a replacement for an operator can easily be found, then the replacement of the operator has less impact on the resource than for operators that cannot be replaced. As such, resources data 116 also includes information indicating the skills of operators and potential replacement candidates. For potential replacement candidates for an operator, availability program 114 identifies of potential operators that match or exceed the skill of the currently utilized operator. If few potential operators are present in resource data 116, then availability program 114 determines a lower resource replacement score.

Figure 2:
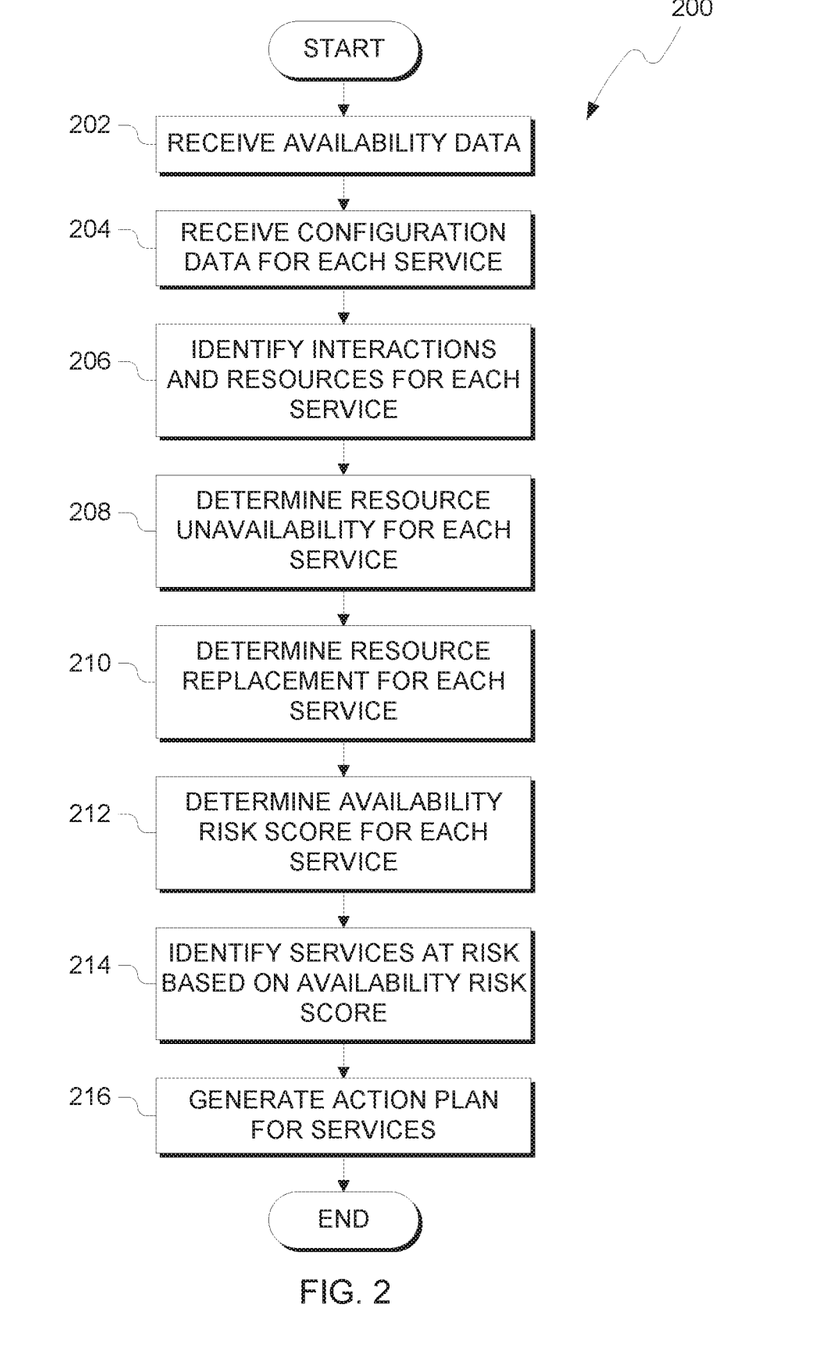
FIG. 2 illustrates operational processes of an availability program, on a computing device within the environment of FIG. 1, in accordance with an embodiment of the present invention.

FIG. 2 illustrates operational processes, generally designated 200, of availability program 114. In process 202, availability program 114 receives availability data 118 associated with the services provided by service provider 110 and the corresponding resources utilized in the services. Availability data 118 provides historic availability information regarding the uptime and downtime of services and the component resources utilized in the services. In process 204, availability program 114 receives configuration data 117 associated with services in the retrieved availability data 118.

Figure 3A:
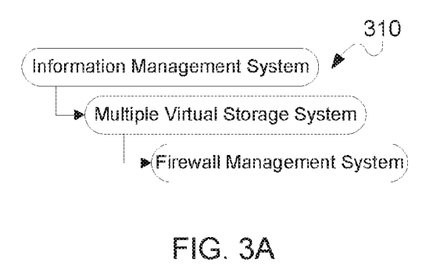
FIGS. 3A-3F depict various example visualizations of the operational processes of an availability program, in accordance with an embodiment of the present invention.

In process 206, availability program 114 identifies the interactions or dependencies for each service. Availability program 114 identifies the systems, subsystems, programs and other services utilized by each service. For example, a webserver service utilizes a database service, indicating that the webserver service is dependent upon the database service. Referring to FIG. 3A, an example interaction diagram 310 is illustrated. An information management system is provided as a service which in turn utilizes a multiple virtual storage system. The multiple virtual storage system relies upon a firewall service provided by a firewall management system.

Figure 3B:
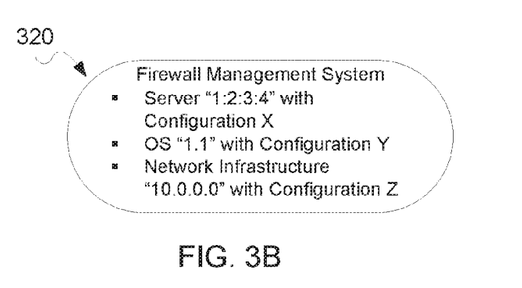

Referring back to process 206 of FIG. 2, availability program 114 identifies the resources utilized by each service. Availability program 114 identifies the resources utilized based on configuration data 117 and resource data 116. Referring to FIG. 3B, an example component resource diagram 320 is illustrated for the firewall management system. Each component resource is identified (e.g., a server is identified with a MAC address, an OS is identified by a version number, and the network infrastructure is identified with the IP address of the network). Additionally, each configuration of the component resources is identified. For example, the server has a certain processor, memory and storage, the OS has certain application installed, and the network infrastructure has certain routers and switches.

In process 208 of FIG. 2, availability program 114 determines a resource unavailability score for each service. Based on historic availability data 118, availability program 114 determines the probability that the resource may become unavailable in the future. For resources with more downtime, availability program 114 assigns higher resource unavailability score than resources with less downtime (i.e., more uptime). In some embodiments, availability program 114 analyzes the entire historic availability data 118 for a resource. In other embodiments, availability program 114 analyzes availability data 118 up to a date in the past (e.g., last six months, last week, etc.). In some embodiments, availability program 114 applies a weight to the historic availability data 118. Availability program 114 applies a larger weight to more recent availability data 118, reflecting current performance of the resource. In some embodiments, availability program 114 also incorporates additional information in the determination of the resource unavailability score. For example, availability program 114 includes the age or lifetime of the resource. As a resource is used, the potential need for maintenance or other scenarios where downtime may occur increases. As such, availability program 114 increase the resource unavailability score for older resources.

Figure 3C:
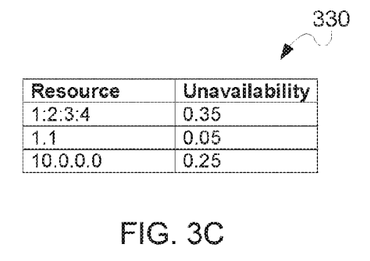

FIG. 3C depicts an example table of resource unavailability scores 330. In some embodiments and scenarios, the resource unavailability scores 330 are determined based on a probability the resources associated with the score may become unavailable sometime in the future. For example, availability program 114 performs statistical analysis of historic downtime to determine the probability that a resource will become unavailable. In some embodiments, availability program 114 determines a probability that a resource will become unavailable based on the age, lifetime, or amount of use of the resource. As a resource incurs more usage, the probability the resource may become unavailable in the future increases. Looking at resource unavailability scores 330 of FIG. 3C, Server 1:2:3:4 has a higher probability of unavailability when compared to OS 1.1 and Network Infrastructure 10.0.0.0.

In process 210 of FIG. 2, availability program 114 determines a resource replacement score for each service. For each resource utilized in a service, availability program 114 determines a resource replacement score. Availability program 114 identifies suitable replacements based on configuration data 117 of the replacement resources. For replacement resources that meet or exceed the configuration of the utilized resources, availability program 114 identifies the matching replacement resources as candidates for replacement of the utilized resource. When a resource has a large number of candidate replacements, availability program 114 determines a higher resource replacement score than for a resource with less replacements. In some embodiments, availability program 114 changes the score based on a complexity of performing a replacement. For example, if installing a replacement for given resource takes longer than replacement for another resource (e.g., migrating large amounts of data, installing drivers, etc.), then availability program 114 decreases the resource replacement score for the resource with a more complex replacement process.

Figure 3D:
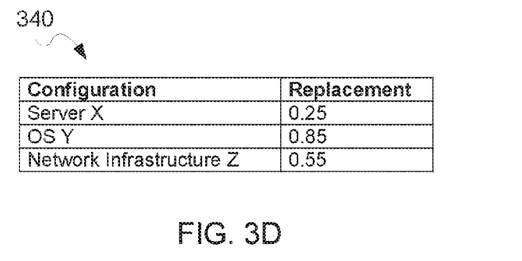

FIG. 3D depicts an example table of resource replacement scores 340. In some embodiments and scenarios, availability program 114 determines resource replacement scores 340 based on the number of potential replacement candidates for a utilized resource. The greater number of candidates, availability program 114 determines a larger resource replacement score. In some embodiments, availability program 114 determines resource replacement scores 340 based on the complexity or difficulty of installing a replacement. Some resources require additional time or effort to be replaced. In such scenarios, availability program 114 decreases the resource replacement scores for comparatively hard or difficult to replace resources. Looking at resource replacement scores 340 of FIG. 3D, servers with configuration x have a comparatively lower replacement score when compared to configuration y of the OS and configuration z of the network infrastructure.

In process 212 of FIG. 2, availability program 114 determines an availability risk score for each utilized resource. Based on the ratio of the unavailability score for the resource and the replacement score for the resource, availability program 114 determines an availability risk score. Resources with high unavailability scores increases or positively correlate with the availability risk score. Resources with high replacement scores decrease or negatively correlate with the availability risk score. Resources with low unavailability scores, but have low replacement scores generate a greater availability risk score. For example, while a resource may have since considerable uptime, the act of replacement if required would put great downtime risk for the service due to lack of candidates or complexity. Conversely, a resource with a high replacement score can have a low availability risk, even if the resource has a greater unavailability risk (e.g., large amounts of historic downtime or potential to have downtime in the future). For example, if a resource is easily replaced, then the less risk the resource imposes on the service. Therefore, the availability risk score as discussed herein provides a quick compassion of two dimensions that greatly impact service availability and provide a strong indicator of resources that may impact downtime of a service in the future.

Figure 3E:
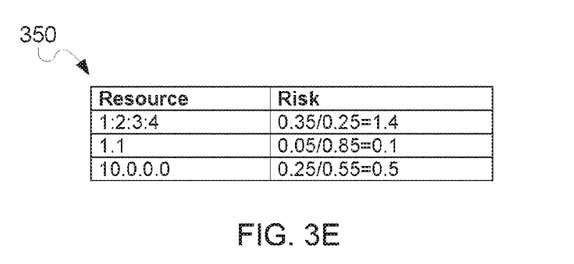

FIG. 3E depicts an example table of availability risk scores 350. Based on the ratio of resource unavailability scores 330 and resource replacement scores 340, availability program 114 determines an availability risk score for each resource. When a greater probability of unavailability in conjunction with a low replacement score is determined, the greater risk that a service will be impacted in the future. Looking at availability risk scores 350, Server 1:2:3:4 is at high risk of becoming unavailable due to both the comparatively high resource unavailability score and comparatively low resource replacement scores. OS 1.1 is least at risk due to the low resource unavailability score and high resource replacement score. Network Infrastructure 10.0.0.0 has comparatively moderate risk due to the high unavailability but also high replacement scores.

In process 214 of FIG. 2, availability program 114 identifies services at risk of future downtime based on the availability risk scores determined in process 212. If the availability risk score of resource for a service exceeds a predetermined threshold, then availability program 114 identifies the service associated with the resource to be at risk. In some embodiments, availability program 114 varies the predetermined threshold based on configuration data 117. In some scenarios and embodiments, some resources have less impact on a service's availability. For example, a redundant storage system may still operate if an array of storage drives fail. Configuration data 117 includes separate availability risk score thresholds based on the impact of the resource of the services availability. In process 216, availability program 114 generates an action plan for services determined to be at risk of becoming unavailable. Based on the range of values of both the unavailability score and the replacement score for the resource identified to be at risk in process 214, availability program 114 provides an action plan for the identified at-risk resource. For example, if the resource has a replacement score above a predetermined threshold, then availability program 114 suggests a replacement. In some embodiments and scenarios, availability program 114 provides a candidate replacement resource indicated in resource data 116. As another example, if the replacement score is below a pre-determined threshold, then availability program 114 provides a maintenance suggestion to improve the availability of the resource.

Figure 3F:
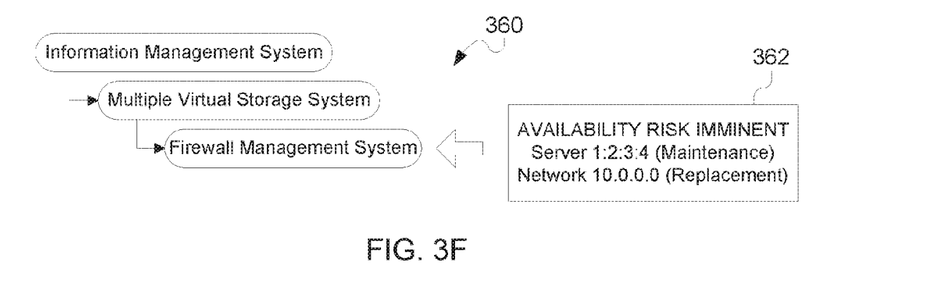

FIG. 3F depicts an example identified service availability diagram 360 with availability risk indicator 362. Availability program 114 provides an indication of which services are at-risk for becoming unavailable in the future. In this example, a predetermined threshold for at-risk services indicated by availability risk scores equal to or above 0.5. In some embodiments, if any resource meets or exceeds the predetermined threshold, then availability program 114 determines the service is at risk. In this example, since both the server and network resources are at-risk, the corresponding firewall service is at-risk. In other embodiments, availability program 114 combines the availability risk scores of the resources as a weighted average, where critical resources are assigned a higher weight. For example, if the server resource was critical to operation but the OS was not, then a higher weight is applied to the availability risk score of the server when compared to the weight associated with the OS. In some embodiments, availability program 114 provides an availability risk indicator 362 when a service is at risk of becoming unavailable. Availability risk indicator 362 indicates the service affected by the potential resource downtime or replacement issues. In some embodiments, availability program 114 provides an action plan for at-risk resources. Based on the resource unavailability scores 330 and the resource replacement scores 340, availability program 114 provides an action plan for the at-risk resources whose availability risk scores 350 exceed a predetermined threshold. In this example, since the replacement score for the server is comparatively low, availability program 114 provides a maintenance action plan. In such scenarios, availability program 114 provides user manuals and other materials for troubleshooting the resource. When looking at network 10.0.0.0, the replacement score for the network is comparatively higher. As such, availability program 114 provides a replacement action plan. In such scenarios, availability program 114 provides potential candidate resources in resource data 116 that meet or exceed the resource requirements indicated in configuration data 117.

Figure 4:
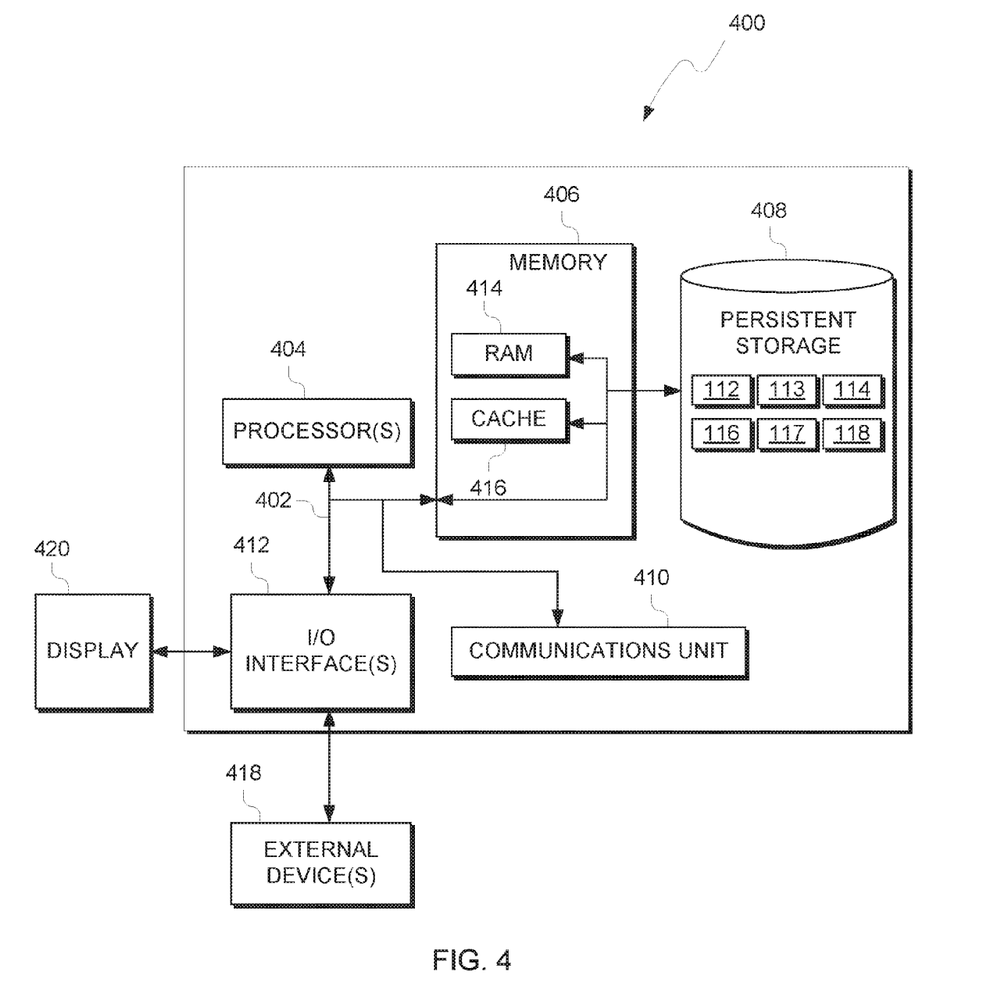
FIG. 4 depicts a block diagram of components of the computing device executing an availability program, in accordance with an embodiment of the present invention.

FIG. 4 depicts a block diagram, 400, of components of service provider 110 and user device(s) 120*a-n*, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Service provider 110 and user device(s) 120a-n includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Service program 112, monitoring program 113, availability program 114, resource data 116, configuration data 117, and availability data 118 and user program(s) 122a-n are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 130. In these examples, communications unit 410 includes one or more network interface cards. Communications unit 410 may provide communications through the use of either or both physical and wireless communications links. Service program 112, monitoring program 113, availability program 114, resource data 116, configuration data 117, and availability data 118 and user program(s) 122a-n may be downloaded to persistent storage 408 through communications unit 410.

I/O interface(s) 412 allows for input and output of data with other devices that may be connected to service provider 110 and user device(s) 120a-n. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., Service program 112, monitoring program 113, availability program 114, resource data 116, configuration data 117, and availability data 118 and user program(s) 122a-n, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method comprising:
receiving, by one or more processors, service availability data for at least one service, wherein the service availability data indicates (i) an amount time the at least one service was available and (ii) an amount of time one or more resources utilized in providing the service was available;
receiving, by the one or more processors, service configuration data for the service, wherein the service configuration data indicates one or more resource requirements of the at least one service;
determining, by the one or more processors, one or more resource unavailability scores for the one or more resources utilized in providing the service;
determining, by the one or more processors, one or more resource replacement scores for the one or more resources utilized in providing the service based, at least in part, on an amount of replacement resource candidates for the one or more resources;
determining, by the one or more processors, one or more availability risk scores for the at least one service based, at least in part, on the one or more resource unavailability scores and the one or more resource replacement scores; and
generating, by the one or more processors, an indication of at-risk services of the at least one service based, at least in part, on the one or more availability risk scores for the at least one service exceeding a predetermined threshold.

2. The method of claim 1, the method further comprising:
identifying, by the one or more processors, at least one interaction between two services of the at least one service; and
in response to a determination that an availability of a first service of the two services is at-risk, determining, by the one or more processors, that an availability of a second service of the two services is at-risk.

3. The method of claim 1, the method further comprising:
generating, by the one or more processors, at least one action plan for the at-risk services, wherein the at least one action plan is based, at least in part, on both of the one or more resource unavailability scores and one or more resource replacement scores.

4. The method of claim 3, the method further comprising:
generating, by the one or more processors, at least one replacement action plan based at least in part one the one or more resource replacement scores exceeding a predetermined threshold.

5. The method of claim 1, wherein the one or more resource unavailability scores is based, at least in part, on a probability that the one or more resources will become unavailable during a period of time.

6. The method of claim 5, wherein the probability that the one or more resources will become unavailable is based, at least in part, on information regarding previous uptime and downtime of the one or more resources.

7. The method of claim 5, wherein the probability that the one or more resources will become unavailable is based, at least in part, on the age of the one or more resources.

8. A computer program product comprising:
one or more computer-readable storage media and program instructions stored on the one or more computer-readable storage media, the program instructions comprising:
program instructions to receive service availability data for at least one service, wherein the service availability data indicates (i) an amount time the at least one service was available and (ii) an amount of time one or more resources utilized in providing the service was available;
program instructions to receive service configuration data for the service, wherein the service configuration data indicates one or more resource requirements of the at least one service;
program instructions to determine one or more resource unavailability scores for the one or more resources utilized in providing the service;
program instructions to determine one or more resource replacement scores for the one or more resources utilized in providing the service based, at least in part, on an amount of replacement resource candidates for the one or more resources;
program instructions to determine one or more availability risk scores for the at least one service based, at least in part, on the one or more resource unavailability scores and the one or more resource replacement scores; and
program instructions to generate an indication of at-risk services of the at least one service based, at least in part, on the one or more availability risk scores for the at least one service exceeding a predetermined threshold.

9. The computer program product of claim 8, the program instructions further comprising:
program instructions to identify at least one interaction between two services of the at least one service; and
in response to a determination that an availability of a first service of the two services is at-risk, program instructions to determine that an availability of a second service of the two services is at-risk.

10. The computer program product of claim 8, the program instructions further comprising:
program instructions to generate at least one action plan for the at-risk services, wherein the at least one action plan is based, at least in part, on both of the one or more resource unavailability scores and one or more resource replacement scores.

11. The computer program product of claim 10, the program instructions further comprising:
program instructions to generate at least one replacement action plan based at least in part one the one or more resource replacement scores exceeding a predetermined threshold.

12. The computer program product of claim 8, wherein the one or more resource unavailability scores is based, at least in part, on a probability that the one or more resources will become unavailable during a period of time.

13. The computer program product of claim 12, wherein the probability that the one or more resources will become unavailable is based, at least in part, on information regarding previous uptime and downtime of the one or more resources.

14. The computer program product of claim 12, wherein the probability that the one or more resources will become unavailable is based, at least in part, on the age of the one or more resources.

15. A computer system comprising:
one or more computer processors;
one or more computer readable storage media; and
program instructions stored on the computer readable storage media for execution by at least one of the one or more processors, the program instructions comprising:
program instructions to receive service availability data for at least one service, wherein the service availability data indicates (i) an amount time the at least one service was available and (ii) an amount of time one or more resources utilized in providing the service was available;
program instructions to receive service configuration data for the service, wherein the service configuration data indicates one or more resource requirements of the at least one service;
program instructions to determine one or more resource unavailability scores for the one or more resources utilized in providing the service;
program instructions to determine one or more resource replacement scores for the one or more resources utilized in providing the service based, at least in part, on an amount of replacement resource candidates for the one or more resources;
program instructions to determine one or more availability risk scores for the at least one service based, at least in part, on the one or more resource unavailability scores and the one or more resource replacement scores; and
program instructions to generate an indication of at-risk services of the at least one service based, at least in part, on the one or more availability risk scores for the at least one service exceeding a predetermined threshold.

16. The computer system of claim 15, the program instructions further comprising:
program instructions to identify at least one interaction between two services of the at least one service; and
in response to a determination that an availability of a first service of the two services is at-risk, program instructions to determine that an availability of a second service of the two services is at-risk.

17. The computer system of claim 15, the program instructions further comprising:
program instructions to generate at least one action plan for the at-risk services, wherein the at least one action plan is based, at least in part, on both of the one or more resource unavailability scores and one or more resource replacement scores.

18. The computer system of claim 17, the program instructions further comprising:
program instructions to generate at least one replacement action plan based at least in part one the one or more resource replacement scores exceeding a predetermined threshold.

19. The computer system of claim 15, wherein the one or more resource unavailability scores is based, at least in part, on a probability that the one or more resources will become unavailable during a period of time.

20. The computer system of claim 19, wherein the probability that the one or more resources will become unavailable is based, at least in part, on information regarding previous uptime and downtime of the one or more resources.

* * * * *